United States Patent [19]
Fenn, III et al.

[11] 3,943,044
[45] Mar. 9, 1976

[54] METHOD FOR TREATING SEWAGE WATER

[75] Inventors: Robert W. Fenn, III, Painesville; Kevin J. O'Leary, Cleveland Heights, both of Ohio

[73] Assignee: Diamond Shamrock Corporation, Cleveland, Ohio

[22] Filed: Nov. 30, 1973

[21] Appl. No.: 420,650

Related U.S. Application Data
[62] Division of Ser. No. 178,291, Sept. 15, 1971, abandoned.

[52] U.S. Cl. .................. 204/149; 204/152; 210/44
[51] Int. Cl.² ...................... C02B 1/82; B01D 5/00
[58] Field of Search ........ 204/149, 152; 210/44, 13, 210/47; 209/164, 179

[56] References Cited
UNITED STATES PATENTS

| | | | |
|---|---|---|---|
| 1,131,067 | 3/1915 | Landreth | 204/149 |
| 1,146,942 | 7/1915 | Landreth | 204/149 |
| 1,194,000 | 8/1916 | Dobyns et al. | 204/149 |
| 1,222,637 | 4/1917 | Landreth | 204/149 |
| 1,344,127 | 6/1920 | Greenawalt | 209/164 |
| 2,194,781 | 3/1940 | Andrus | 204/149 |
| 2,997,430 | 8/1961 | Föyn | 204/151 |
| 3,035,992 | 5/1962 | Hougen | 204/149 |
| 3,347,786 | 10/1967 | Baer et al. | 210/45 |
| 3,479,281 | 11/1969 | Kikindai et al. | 210/44 |
| 3,505,188 | 4/1970 | Pan | 204/149 |
| 3,586,627 | 6/1971 | Gooch | 204/149 X |
| 3,632,498 | 1/1972 | Beer | 204/290 F |
| 3,684,703 | 8/1972 | Marmo | 210/13 |

*Primary Examiner*—G. L. Kaplan
*Assistant Examiner*—A. C. Prescott
*Attorney, Agent, or Firm*—Timothy E. Tinkler

[57] ABSTRACT

A system and apparatus for disinfecting sewage water and removing suspended solids therefrom by in-situ treatment with chemical agents and gases, each produced electrolytically, comprising a treatment chamber, disinfecting and solids conveying means including at least one pair of electrodes disposed in the chamber, solids removal means associated with the chamber, a source of aqueous alkali metal halide solution and optionally an ultraviolet light ray source and solids collection means.

2 Claims, 3 Drawing Figures

Fig.II

ROBERT W. FENN III   INVENTORS
KEVIN J. O'LEARY

BY Gerard G. Weil

ATTORNEY

METHOD FOR TREATING SEWAGE WATER

This is a division of my copending application Ser. No. 178,291, filed Sept. 15, 1971, now abandoned.

BACKGROUND OF THE INVENTION

This invention relates generally to apparatus and methods for treating sewage water mixtures containing suspended solids to reduce the biochemical oxygen demand, BOD, and chemical oxygen demand, COD, suspended solids and bacteria content thereof and more particularly to such apparatus and methods adapted to be installed in sewage treatment plants of varying size, in boats having a marine toilet, in airplanes, trains, buses, mobile homes, travel trailers, vacation cottages, and the like wherein toilets having an operating mechanism similar to marine toilets are utilized.

The scope of this invention is not intended to be limited to portable and small scale applications as the invention is equally applicable to the treatment of large volumes of sewage water as might be encountered in apartment houses, housing developments, camping grounds, ships with large crews and the like, where the sewage producing population may be smaller than urban size.

In recent years increasing pollution of lakes and streams by sewage has created a pronounced health hazard. The problem has been accentuated by the increase in population, particularly in smaller population areas and in resort areas where sewage treatment facilities are inadequate. The rapidly expanding number of boat owners and users for recreational purposes have contributed to the pollution of lakes and streams by the attendant discharge of untreated sewage and other debris from the steadily increasing number of pleasure boats. In fact, pollution of streams and bodies of water from all sources has increased in such alarming proportions that state and federal authorities are seriously concerned with the problem and at present regulatory legislative action is being formulated by both the federal and the majority of state governments in the United States. Thus it will be seen that an urgent need exists for proper treatment of sewage water mixtures prior to discharge from municipalities, resort areas, vacation cottages, travel trailers and the like.

Various techniques have been previously proposed for the electrolytic treatment of sewage water mixtures from various sources, including boats, but none has proved entirely satisfactory for various reasons. One type of proposed treatment has been the disintegration of the contained solids matter in the sewage water and subsequent passage of the mixture through an electrolytic cell for disinfection of the water by the process of electrolysis of brine or sodium chloride solution contained in the said cell. However, after the disinfection treatment the mixture must be allowed to settle for extended time periods. The solids precipitated and flocculated by hydroxides formed during the electrolysis, after separation by settling, may either be conducted as a slurry into a body of water or may be isolated, dried and used as a fertilizer. This type of treatment, in addition to the time-consuming settling period, suffers from the disadvantages that the introduction of the slurry into the water creates pollution problems and the conversion of the solids to fertilizer involves time consuming expensive processing procedures and equipment. Another type of previously proposed apparatus for treatment of sewage water utilizes a diaphragm-type cell for electrolysis of sodium chloride solution in which chlorine is produced in the anode compartment and caustic solution and hydrogen gas produced in the cathode compartment. Since the sodium chloride solution is introduced into the anode compartment and sewage water into the cathode compartment, the latter is not exposed to chlorine gas and the alkaline cathode solution must be mixed with the chlorine-containing anolyte solution to sterilize the sewage water originally introduced to the cathode compartment. Alternately, the catholyte solution may after treatment be conducted to the anode compartment for sterilization therein. Such diaphragm-type cells require more maintenance than the diaphragm-free type cell as the diaphragms must be frequently cleaned and periodically replaced and additionally the cells have higher energy consumption than diaphragm-free cells. It is also necessary in the diaphragm-type cell to retain the sewage water in the cathode compartment until it becomes sufficiently alkaline so that precipitates may be formed from the alkaline materials contained in the sewage water to occlude the suspended solids in the sewage water for removal therefrom. Such treatment is time consuming and prevents rapid sterilization of the sewage water mixture.

The invention provides the advantages of concurrent rapid sterilization of the liquid portion and rapid separation by flotation of the solid portion of a sewage water mixture. Such advantages as hereinafter described result from exposure of the sewage water mixture to chemical agents produced in situ by electrolysis of a sewage water mixture containing sufficient alkali halide content capable of forming said chemical agents.

The term sewage water as used in this specification and claims means waste water from any source such as industrial water disposal, direct toilet discharge or any other type of disposed sewage liquids.

STATEMENT OF THE INVENTION

A primary object of the present invention is to provide an electrolytic apparatus and method for rapidly and efficiently removing suspended solids from, and disinfecting by electrolysis sewage water mixtures in which the initial liquid content thereof may be fresh water or a saline solution.

A further object of the present invention is to provide an electrolytic apparatus and method for rapidly and efficiently removing the suspended solids from, and disinfecting the sewage water effluent from marine-type toilets, the liquid content of which effluent may be fresh water, seawater or brackish water.

An additional and correlative object of the present invention is to provide such apparatus which permits wide variation in size for both large scale and portable applications and installation in space-restricted locations without sacrifice of the desirable results.

These objects are obtained by the provision of an apparatus and process capable of disinfecting the sewage water mixture, a combination sitrrer-disintegrator for converting the suspended solids to small particle size materials, disinfecting and solids conveying means comprising at least one pair of diaphragm-free electrodes including a closely-spaced cathode and a dimensionally stable anode and a source of aqueous alkali metalhalide solution and effluent means for removing the sterilized, substantially solids-free water from the chamber. The process comprises:

disintegrating the suspended solids of a sewage water mixture;

electrolyzing an admixture of the sewage water and an aqueous alkali metal halide solution in a chamber having disposed therein at least one cathode and at least one dimensionally stable anode, solids removal means and means for discharging the disinfected liquid portion of the admixture, whereby the sewage water is disinfected and the suspended solids conveyed to the surface of the admixture;

discharging the disinfected liquid portion of the admixture from the chamber;

removing the solids from the chamber and optionally collecting and/or destroying the removed solids.

In one embodiment of the invention the inlet of the above described apparatus is connected to the outlet of a marine-type toilet for treatment of the sewage mixture. The marine-type toilet is of the conventional type including a soil pump which may be either hand or electrically operated. The treatment apparatus is arranged to operate intermittently in accordance with the operation of the marine-type toilet when the latter is electrically operated. The soil pump operates in the conventional manner to provide the water from a saline or fresh water source to flush the waste material from the toilet. Where the toilet water source is sea water or saline solution, such as salted fresh water, the apparatus is operable without additional additives to the sewage water mixture since the saline solution serves as the electrolyte. However, where the water source is fresh water, means must be provided for a source of saline solution. In hand operation of the soil pump a connection may be made between the water inlet of the toilet and a saline solution source whereby the solution is carried into the toilet with the flushing water by suction operation of the soil pump, mixed with the waste material and the current-conducting mixture pumped into the treatment chamber. When the marine-type toilet is electrically operated a separate pump may be connected from a salt water supply to the water intake line of the toilet whereby a saline solution is pumped into the toilet with the fresh water intake and combines with the waste material to form a mixture which is then flushed into the treatment chamber. The means presently preferred for supplying saline-solution during either manual or electrical operation of the marine toilet in accordance with this invention is to position a salt bed container for dry salt in solid block, fine crystalline or pellet form, in the upper part of the treatment chamber. A conduit is connected to and extends from the water intake of the marine-type toilet to communicate with an inlet of the treatment chamber located just above the salt bed container. Water flowing through the inlet passes over the salt bed thereby forming a concentrated saline solution which because of its high specific gravity remains at the bottom of the chamber. When a salt bed is utilized within the chamber a partition must be disposed in the chamber separating the salt bed from the remainder of the chamber. A conduit is positioned to extend from a point near the lower portion of the partitioned salt bed section through the partition into the other partitioned section of the treatment chamber wherein the electrodes are positioned. Water entering the salt bed section of the chamber forces the concentrated brine solution to flow through the conduit into the section of the chamber where the electrodes are mounted.

The invention provides several advantages over the prior art. The sewage water may be treated for sterilization and removal of contained solids concurrently by exposure to in-situ electrolytically generated treating agents all in a single chamber or vessel. In prior art methods chemical agents are usually generated or provided in a seperate vessel and then introduced into the treating container which design requires additional equipment and space. The in-situ electrolytic treatment of the present invention by providing sterilization and solid removal affords rapid treatment of the sewage-water mixture, e.g., the treatment may be completed in a half hour or less, generally 15 minutes or less. The type of bubble formation provided by this invention results in a surprising and unexpected rapid flotation of the solids to the surface of the sewage-water mixture. This unexpected rapid removal of solids enables the treatment to be successrully completed very quickly at decreased expense. The manner in which the bubble formation is developed by the dimensionally stable anodes in the practice of the present invention is not completely understood, but the rapid flotation of the suspended solids to the surface of the sewage water mixture is a reproducible and advantageous phenomenon which enables rapid removal of the solids and avoids a lengthy retention period for settling of the solids or provision of an alkaline solution from a separate source for flocculation and flotation of said solids. Also, this technique of the present invention enables portable and/or compact units to be installed where the volume of sewage water to be treated is low, infrequent or intermittent treatment is required, or where compact units are mandatory by virtue of limited installation areas. In known prior art electrolytic treatment large scale expensive equipment is generally used. Such equipment is unsatisfactory for many applications where portability and/or compact equipment are important considerations. The invention also provides an effluent after treatment of the sewage water mixture which may be discharged without violation of regulatory standards. The solids removed in accordance with the practice of this invention have a substantially zero coliform count as evidenced by coliform analysis. Solids removed by prior art techniques generally have a high coliform count which makes their disposal difficult, i.e., a pollution contamination problem exists in their disposal.

Another important advantage of the present invention is the use of dimensionally stable anodes. Such anodes, as their name implies, require infrequent maintenance and replacement and permit the attainment of high current and power efficiency especially when sea water or a low salt content saline solution is used for the electrolyte. When these anodes are employed the electrodes may be closely spaced with a gap or spacing which provides maximum power efficiency as the small gap permits a lower volume of electrolyte to flow between the electrodes with consequent decreased electrical resistance to the passage of current from the anodes to cathodes. It has also been found that the dimensionally stable anodes provide a unique bubble formation which serves to rapidly and efficiently convey suspended solids to the surface of the mixture being treated in the form of a foam or low density solid mass which may easily be removed from the surface of the solution by various means such as by skimming or scraping devices or through specifically designed overflow outlets. Heretofore it has been customary to use high alkaline materials for mixture with the sewage water mixture being treated in order to coagulate precipitate or occlude the solids. The alkaline material is usually either supplied from a separate source or by retaining the sewage water being treated in the cathode compartment of an electrolytic cell until a solution of high alkalinity is obtained, so that the alkaline materials precipitate and flocculate the suspended solids. The rapid flotation of the suspended solids to the surface of the mixture provided by the instant invention obviates the prior art requirement of solutions of high alkalinity for flocculating or occluding said solids.

BRIEF DESCRIPTION OF THE DRAWINGS

The above objects and advantages together with others which will become subsequently apparent reside in the details of construction and operation as more fully hereinafter described and claimed, reference being had to the accompanying drawings wherein common reference numbers refer to the same or similar parts, and in which:

DESCRIPTION OF THE PREFERRED EMBODIMENTS

Figure 1:
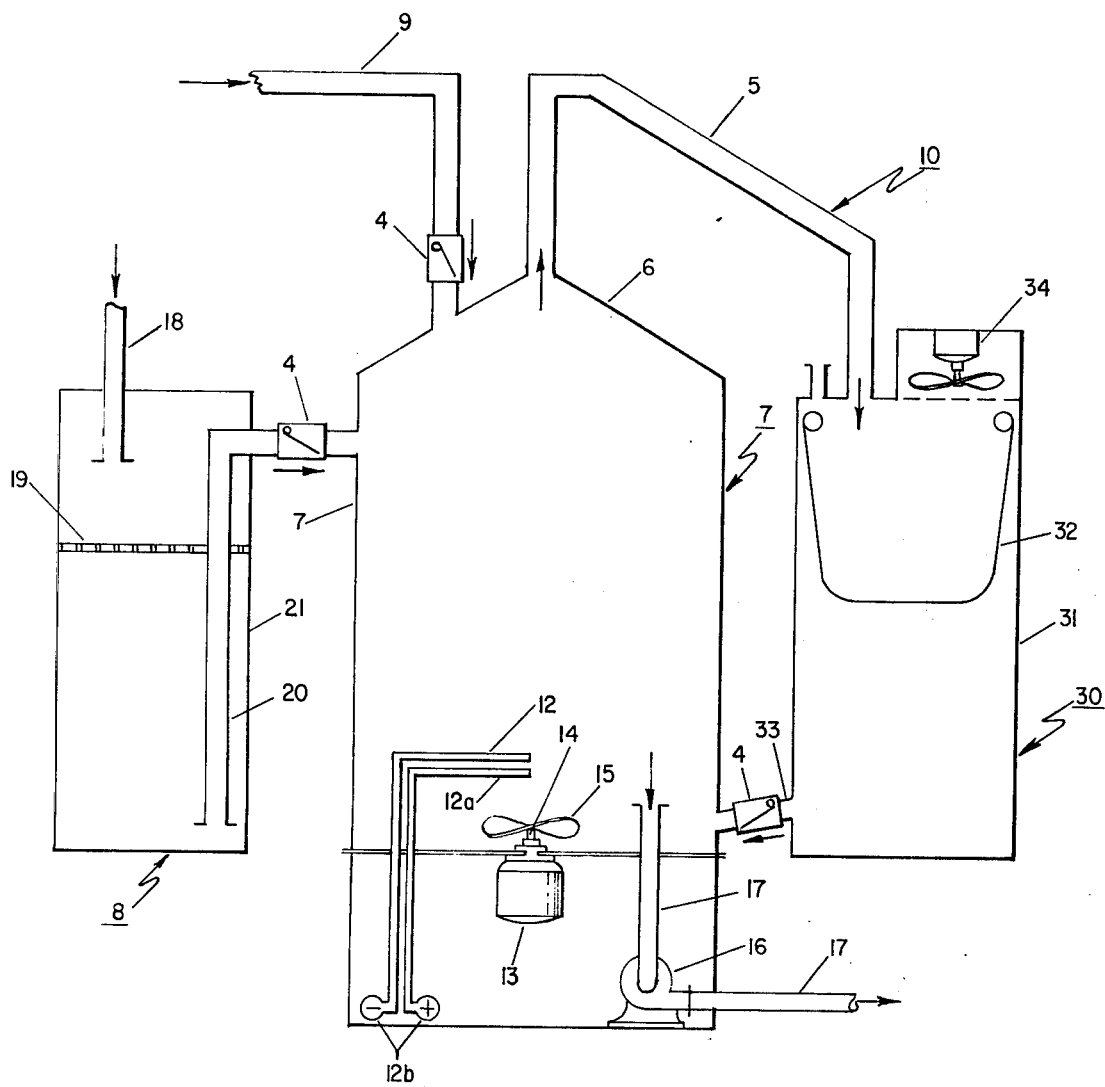
FIG. 1 is a schematic representation of one embodiment of the apparatus illustrating a cylindrical chamber having upwardly inclined top walls in the form of an inverted cone in accordance with this invention.

Referring more particularly now to the drawings in FIG. 1 the sewage water treatment apparatus is shown generally at 10. The apparatus includes treatment chamber 11, having top walls 6, upwardly inclined from the top edges of the side walls to form a pyramidally-shaped-chamber top, dimensionally stable anode 12a, cathode 12b, power lead connections 12, a motor 13 having stirrer and disintegrator blades 15, attached to the shaft 14 thereof, effluent pump 16, salt bed 19, water inlet 18, brine conduit 20, and sewage water inlet conduit 9. The treatment chamber 11 may be constructed of any material which is inert or not substantially affected by the environment of the treating chamber, for example, it may be constructed of a polymorphic material such as rubber or plastic, e.g., polyvinyl chloride and the like. The structural material of the other elements of the apparatus should be selected so that they are also unaffected by the environment of the treatment chamber. Motor 13 is a conventional motor and may be selected in accordance with the size of the treatment chamber and required rotation adequate for disintegrating the solids contained in the sewage water mixture. Optionally, the disintegrator may be used externally of the chamber for macerating the solids of the sewage water mixture prior to the introduction of said mixture to the chamber.

The electrode pair comprise at least one dimensionally stable anode 12a and a cathode 12b and power connections 12 to leads, not shown. A source of current, not shown, is supplied to the anode for electrolysis of the halide solution of the sewage water mixture.

The dimensionally stable anode 12a comprises a valve metal electrically conductive substrate with a surface coating thereon of a solid solution of precious metal oxide and valve metal oxide. In these solid solutions an atom of valve metal in the characteristic rutile valve metal oxide crystal lattice is replaced with an atom of precious metal. This distinguishes from mere physical mixtures of the oxides, pure valve metal oxides in fact being insulators. Such solid solutions are both electrically conductive and electrocatalytically active.

In the solid solutions the valve metals include titanium, tantalum, niobium and zirconium while the precious metals encompass platinum, ruthenium, palladium, iridium, rhodium and osmium. Titanium dioxide-ruthenium dioxide solid solutions are preferred at this time. The mole ratio of valve metal:precious metal varies between 0.2–5:1, approximately 2:1 being presently preferred. The valve metals of the electrically conductive substrate are those defined above as included in the solid solutions.

If desired, these solid solutions may be "modified" by the addition of other components which may either enter into the solid solution itself or admix with the same to achieve a desired result. For instance, it is known that a portion of the precious metal oxide, up to 50%, may be replaced with tin dioxide without substantial detrimental effect on the overvoltage. Likewise, the solid solution may be modified by the addition of cobalt compounds particularly cobalt titanate. Solid solutions modified by the addition of cobalt titanate, which serves to stabilize and extend the life of the solid solution are described more completely in copending application Ser. No. 104,743 filed Jan. 7, 1971, now abandoned. Other partial substitutions and additions ae encompassed. The above-mentioned preferred coatings and thermochemical deposition thereof on a substrate are described in more detail in British Pat. No. 1,195,871.

It has been found that when the particularly preferred type of dimensionally stable anode is employed in the apparatus of this invention gas bubbles develop at the anode and combine in a manner such that they cause rapid flotation of the suspended solids of the sewage water mixture to the surface of the vessel. While this phenomenon is not completely understood it has been found to be effective in providing rapid flotation of the solids.

Although the preferred dimensionally stable anodes described above are particularly desirable in the practice of this invention other dimensionally stable anodes constructed of a valve metal substrate, preferably titanium, having a coating of precious metals or precious metal alloys on at least part of its surface may be used with satisfactory results.

The cathode, positioned in close relationship to the dimensionally stable anode should be constructed of a metal resistant to the cell environment, e.g., titanium. It is important that the anode and cathode be positioned as closely as practicably possible to provide maximum power efficiency since the larger the gap between cell electrodes the more voltage is required in overcoming the resistance of the electrolyte solution flowing between said electrodes. While only one pair of electrodes are shown in the drawings, as many pairs may be utilized as are necessary in accordance with the size of the treatment vessel and the volume of sewage water mixture being treated. The electrodes are preferably disposed in horizontal parallel position to facilitate the rapid ascent of the gas bubbles and concurrent conveyance of the solids to the surface of the mixture. The effluent pump 16 disintegrator motor 13 and electrode leads 12 are preferably positioned externally of the treating chamber. Conduit 17 is positioned at the bottom of the chamber in order that sewage water mixture from which the suspended solids have been removed by flotation may be discharged from the treating chamber to a desired disposal site. When the incoming sewage water mixture contains a saline solution from any source prior to being introduced into the chamber water inlet 18, salt bed 19, and conduit 20, extending through wall or partition 21, of brine supply tank 8 and wall 7 of chamber 11 and one-way valve 4, are inoperative. However, when the entering sewage water mixture does not contain saline solution, fresh water is introduced through inlet 18. Inlet 18 may be located in the top or upper sidewall of the treating chamber and salt bed 19 disposed at a position intermediate the top and bottom walls of the treating chamber. Conduit 20 extending from a point adjacent the bottom of the treating chamber through an opening in partition 21 is operative for delivering solution to chamber 11 only when the sewage water mixture introduced into the treating chamber at inlet 9 does not contain saline solution, as will be more fully explained hereinafter in the discussion of the operation of the apparatus.

Figure 3:
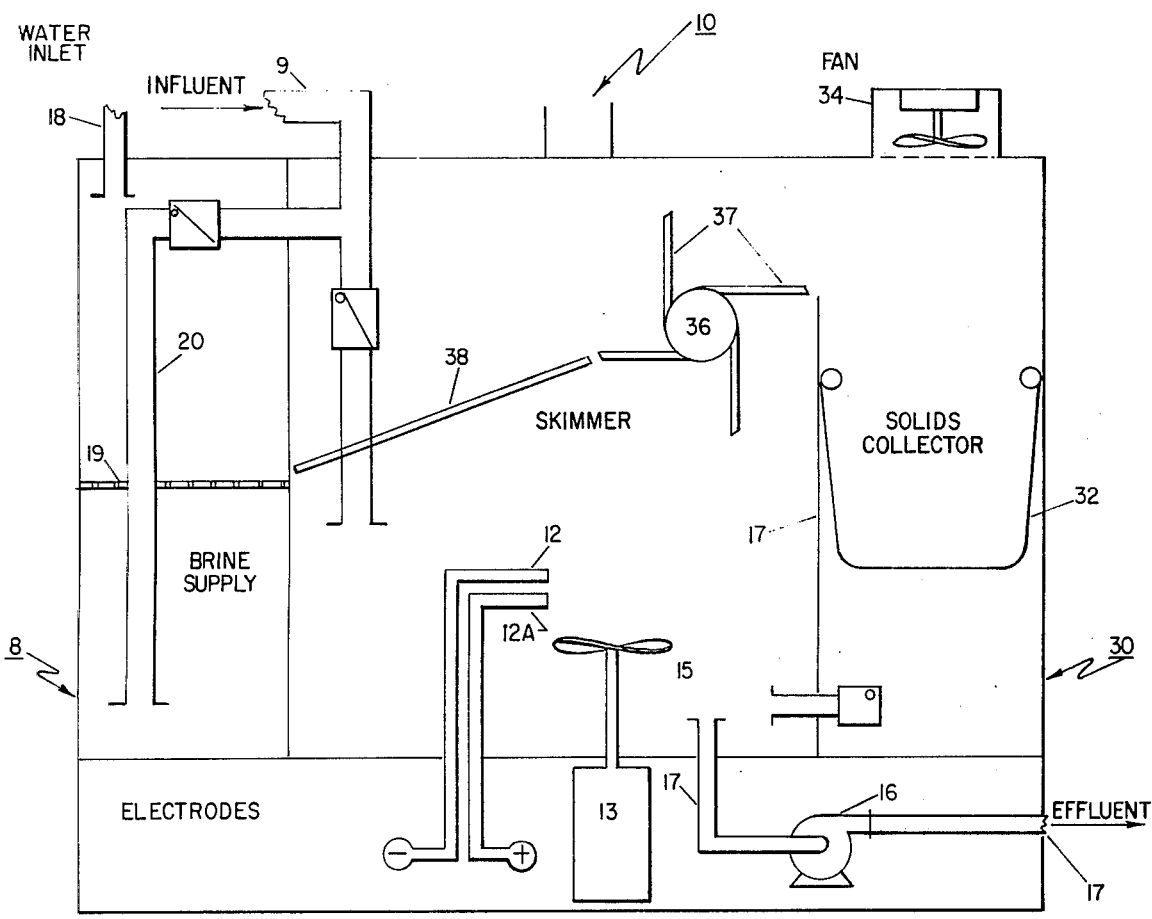

During operation of the apparatus a sewage water mixture, generally containing a saline solution, is introduced into treating chamber 11, the disintegrator is operated for a short interval, generally from less than one minute to about ten minutes, preferably about two minutes and turned off. Suspended solids contained in the mixture are disintegrated by the stirrer and macerator blade 15, connected to the shaft of pump 14 which blades have shapes and sharp edges designed to disintegrate the solid materials. Current is then supplied to the pair of electrodes. The sewage water mixture flowing through the gap between the dimensionally stable anode and cathode is electrolyzed. The chemical agents such as sodium hypochlorite provided by the reaction of a mixture of the chlorine, formed at the anode and sodium hydroxide formed at the cathode, permeate the sewage water mixture and sterilize or disinfect the liquid portion thereof. As herebefore mentioned the gas bubbles formed at the anode rise rapidly throughout the mixture causing the suspended solids to rise to the surface of the mixture. The solids conveyed to the surface are in the form of a foam-like substance which may readily be removed by various means such as skimming or scraping devices or a weir arrangement whereby the solids may be caused to flow from the chamber by influent sewage water and may be collected for convenient disposal. A solids collector which may be optionally utilized in combination with the other apparatus of the invention is shown in FIGS. 1 and 3. The collector 30, includes vessel 31, with a disposable filter bag 32, positioned therein for receiving solids from conduit 5. The solids remain on the filter bag and the liquid filtrate which passes through the bag into the lower portion of vessel 31, may be returned for further treatment to chamber 11 through conduit 32 and one-way valve 4. A fan 34 may be arranged to assist the drying of the solids retained by the filter bag. The filter bag may be any material suitable for retaining the solids and preferably is made from material readily disposable along with the contained solids in any convenient and practical manner. An especially convenient and preferred manner of disposing of the filter bag and collected solids is by burning after the materials are substantially dry. As collected about 90% of the water has been separated from the waste material and the residue has a high concentration of carbonaceous matter. After the water retained by the carbonaceous matter has been removed by flame contact or other drying means the residue may be completely converted to a small quantity of ash by flame contact or other heating means.

It should be understood that although halide solution tank 8, chamber 11 and vessel 31 are shown as separate structures a unitary structure may be formed by combining the three units with the adjacent side walls then forming in combination compartments of a unitary structure. A unitary structure is shown in the embodiment of the invention illustrated in FIG. 3.

One of the outstanding features of the instant invention is the structure of the top portion of the chamber of FIG. 1. The upwardly tapered sidewall, pyramidal and inverted cone designs have been found to greatly facilitate the removal of the solids from the chamber after said solids have been conveyed to the surface of the admixture. This particular design structure surprisingly and very unexpectedly provides removal of solids from the treatment chamber with no required auxiliary apparatus such as scrapers, skimmers and the like. In fact, the design may be considered to provide self-removal of the solids as movement of the solids proceeds rapidly and efficiently upwardly to the aperture at the apex of the upwardly tapered sidewall structure, pyramid or inverted cone and into the conduit connected to the aperture for convenient disposal. Such designs provide substantially maintenance-free operation of the apparatus as all moving parts may be eliminated from the treatment chamber if the solids contained in the sewage water mixture are disintegrated prior to introduction of the mixture into the treatment chamber. Although the solids may be removed by overflow methods such as weir or baffle arrangements and the like such techniques cause buildup and resultant delayed removal of the solids and interference with the other components of the apparatus. Consequently most presently available treatment devices necessarily utilize some type of mechanically operated means for solid removal.

Another very important and practical advantage of the above-described upwardly tapered sidewall, pyramidal and inverted cone top portions results when the invention is utilized in combination with a marine toilet. Because of erratic movement of boats caused by water and wind conditions, sewage treatment devices installed on boats are subject to spillage and other disturbance or overflow of the contents. Such erratic movement also may result in interference with mechanically operated solids removal equipment. The chamber top structural configuration of the FIG. 1 embodiment of the present invention avoids such disadvantages in that if the chamber is tilted by erratic motion any resultant overflow will be contained by the closed top and discharged through the conduit connected at the chamber aperture for the usual normal removal of solids. Such beneficial operation is made possible not only by the structural design but also by the absence of any mechanically operated solids removal means at the surface of the admixture.

The effluent pump 16, as noted above, is positioned on or proximate to the bottom wall of the treatment chamber for discharging the disinfected liquid. Since the liquid portion of the sewage water mixture being treated is substantially free of solid matter which has been conveyed by flotation to the surface of the chamber during treatment, the liquid portion may be discharged through effluent pump 16, and conduit 17 which extends outside the treatment chamber. The effluent is disinfected sufficiently light in color, low in solid content and odor so that it may be disposed of without creating a health hazard or pollution problem, thus being in conformance with existing and probable future statutes intended to regulate the disposal of such materials.

When the sewage water mixture introduced into the treating chamber does not contain saline solution such solution may be added to the mixture through conduit 20, positioned in tank 8. Fresh water may be introduced through the inlet 18 so that it flows over the salt bed which may contain salt in the form of fine crystals, granules, blocks, or pellets. The water passes over the salt bed to form a saline solution which because of its high density flows to the bottom of tank 8 and forms a saline solution reserve. When additional fresh water is added through inlet 18, saline solution from the reserve at the bottom of the tank is forced upwardly by hydrostatic pressure through conduit 20, into treatment chamber 11 where it is admixed with the sewage water mixture and subjected to electrolysis. Water is added through inlet 18 in predetermined amounts to provide a saline solution having a sodium chloride content of about 1.0 g/l to about 100 g/l, preferably from about 5.0 g/l to about 30.0 g/l.

Figure 2:
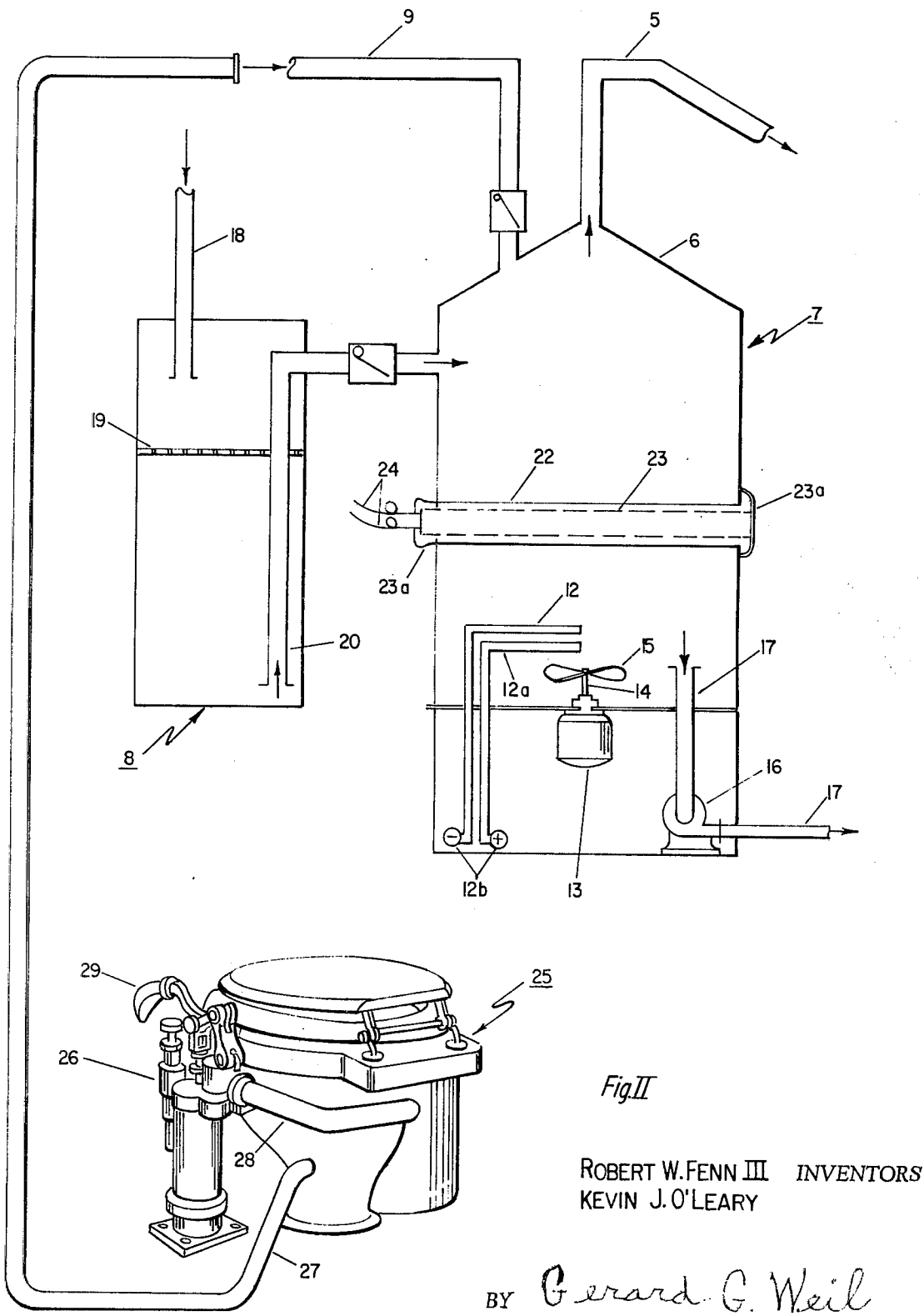
FIG. 2 is a schematic representation of the same apparatus as shown in FIG. 1 in which the solids collector is omitted for simplicity but including additionally an ultra-violet light ray source and a conventional marine toilet connected to an inlet of the chamber and FIG. 3 is a schematic representation of another embodiment of the apparatus wherein a skimmer device is mounted in the chamber in accordance with this invention.

Referring to FIG. 2 a conventional marine toilet is shown generally at 25, in combination with the apparatus illustrated in FIG. 1. The apparatus operates basically in the same manner as described in conjunction with the operation of the apparatus in FIG. 1 with only a few variations. In the embodiment of the invention depicted in FIG. 2 the waste water mixture of toilet 25 is discharged by means of soil pump 26, and connected toilet discharge conduit 27 into inlet 9 of the treatment chamber 11. When the toilet is manually operated soil pump handle 29 is actuated manually and serves to feed water into the toilet closet for flushing purposes and also to remove the waste water mixture through discharge conduit 27. Where the toilet is designed for electrical operation the described manual operations are performed automatically by conventional electric circuitry and associated motor means activated by a starter switch, not shown. When the source of water introduced into the toilet contains a saline solution no modifications in the operations described are required. However, when fresh flushing water is introduced into the toilet it is necessary to add saline solution to the treating chamber. Such addition may be made as described in the operation of the apparatus for FIG. 1 either by introducing a source of saline solution to inlet 18 or inlet 9 by pump means or by introducing fresh water through inlet 18 in such a manner that it flows over the salt bed 19 to form and provide a source of brine solution at the bottom of tank 8. When fresh water is to be introduced at inlet 18 it has been found desirable to connect one terminal of a conduit to the water inlet pipe 28 of the marine toilet and the other terminal to the water inlet 18 of tank 8. In this manner when the soil pump is operated either manually or electrically the action of the soil pump in drawing water into the toilet through pipe 28 by suction operation also serves to supply water to inlet 18 and tank 8 containing the salt bed. This arrangement is preferred over that where a separate source of fresh water is supplied to the water inlet of the treatment chamber since it provides for a completely automatic operation of the apparatus when fresh water is required to be introduced into the treatment chamber.

Also in FIG. 2 an ultraviolet light source 23 is shown disposed in chamber 11. The solids collector 30 of FIG. 1 has been deleted in FIG. 2, for simplicity. An ultraviolet light source in the form of a mercury vapor lamp 23, preferably of sufficiently low voltage to allow operation from a twelve volt battery, is enclosed in a quartz tube 22, which is mounted in apertures in the wall of the treatment chamber. Protective fluid impermeable and electrically insulating seals 23a, are mounted in the wall apertures for retaining the quartz tube 22. Leads 24, are connected to the ultraviolet light source 23, and to a power source for generating ultraviolet light, not shown. The ultraviolet light ray source may be used in combination with the apparatus of FIG. 1 or the embodiment of the invention in FIG. 3. Any suitable form of ultraviolet light ray source may be used provided it does not interfere with the operation of the various elements of the apparatus. The ultraviolet ray light source is utilized to expose the sewage or other waste water mixture to ultraviolet light rays prior to and/or during the electrolysis of said mixture. The use of the light rays prior to electrolysis appears to supplement the disinfecting action of the chemical agent formed during electrolysis and may reduce the required treatment time for sterilizing the sewage water mixture. The ultraviolet rays, when used in combination with the chemical agents formed in-situ by electrolysis, appear to cause sterilization of the sewage water mixture more rapidly than when only the chemical agents are used. It is postulated, therefore, that a synergistic effect may be present. It has been determined that although the coliform count of the solids separated from the mixture during treatment and dried is substantially zero shortly after separation, that the count remains substantially zero even after extended periods of storage of the solids, e.g., from about 1 to about 7 days when the mixture is exposed to ultraviolet rays.

Another embodiment of this invention is shown in diagrammatic form in combination with solids collector vessel 30 in FIG. 3. The diagrammatic view of the apparatus of FIG. 3 differs from the representation of FIG. 1 in that a skimmer device and contiguous baffle are included in combination with the solution supply tank 8, treatment chamber 11 and solids collector vessel 30 are included in compartment arrangement in a unitary structure. The skimmer device 35 comprises a rotatable cylinder 36 having a multiplicity of solids pickup blades or arms attached to the periphery of the cylinder. During rotation of the cylinder the blades rotate at the same speed and scoop solids from the surface of the admixture and deposit the solids in the collector filter bag 32. Baffle 38 is attached to a partition at one lower edge and is inclined upwardly to a point where the upper edge terminates contiguous to the unattached ends of the skimmer blades. The baffle is upwardly inclined to cause the rising solids to travel along its inclined plane to the upper edge of the baffle where the skimmer blades scoop the solids from the admixture surface.

Whenever the term "saline solution" is used herein it refers to an aqueous sodium chloride solution with a sodium chloride content which affords suitable operating results and which generally ranges from about 5.0 grams per liter to about 30.0 grams per liter.

The word pyramidal wherever included in this specification and claims means any structure or portion thereof narrowing gradually to an apex from a supporting base.

In order that those skilled in the art may more completely understand the present invention and the preferred methods whereby the same may be carried into effect, specific examples are presented in the following table.

In the examples presented in the table the sewage water treatment was carried out batchwise by placing the wastewater in a treatment chamber of the type shown and described in FIG. 1 of the drawings. In Examples 4 to 6, inclusive, water was added to the chamber to provide sufficient volume in the treatment chamber for suitable operation of the equipment. The sodium chloride content of the admixture in the chamber was 10 g/l for all the examples except Example 2 which was 2 g/l. The sewage water mixture containing saline solution was subjected to disintegration after being placed in the treatment chamber by operation of the disintegrator for about one-half of a minute. After the disintegrator motor was turned off the mixture was electrolyzed for the time periods set forth in the table.

unexpected as extended periods have previously been required to accomplish such reduction. Not only the lengthy time but also the expense and size of the equipment required to accomplish such results make known processes and apparatus unsatisfactory for wastewater treatment generally, and particularly for treatment at intermittent intervals and/or where small volumes must be treated. Where the influent of sewage-water mixture is continuous the solids are caused to overflow chamber 11 and enter conduit 5 for convenient disposal by influent displacement of the mixture being treated. Where operation and flow of the mixture into the treatment chamber is intermittent, the solids may be caused to overflow and exit through conduit 5, by introducing water or an inflatable displacement device into chamber 11.

Satisfactory results are obtained in the practice of the process of the instant invention by treatment of sewage water mixtures without dilution although in some instances the influent source may be diluted prior to or subsequent to introduction to the treatment chamber. The apparatus, for practical reasons, is designed to contain a quantity of sewage water mixture, not only variable in accordance with the current input required to be treated but also to meet anticipated future increases in treatment capacity requirements. Thus, the amount of influent sewage water during certain periods is insufficient for satisfactory processing and water

TABLE 1

WASTEWATER TREATMENT RESULTS

| Ex. No. | Type of Wastewater | Dilution Factor (Ratio of Dilution Water to Sewage Water) | Time of Electrolysis (min.) | Percentage Reduction or Removal | | | Coliform/ 100 ml. | Biochemical and Chemical Oxygen Demand | |
|---|---|---|---|---|---|---|---|---|---|
| | | | | Biochemical Oxygen Demand (BOD) | Chemical Oxygen Demand (COD) | Total Suspended Solids | | Initial (ppm) | Final (ppm) |
| 1 | Research Laboratory Building | Not diluted | 10 | | 83 | | 100 | COD 2890 | 492 |
| 2 | Sewage Water Effluent | Not diluted | 10 | | 71 | | 100 | COD 2810 | 720 |
| 3 | | Not diluted | 7 | | 90 | | 100 | COD 2800 | 286 |
| 4 | Toilet Effluent | 2.25 | 9 | | 83 | | 100 | COD 10740 | 1809 |
| 5 | | 1.5 | 10 | 66 | 72 | 88 | 100 | COD 7831 BOD 1200 | 2172 403 |
| 6 | | 2.35 | 15 | 80 | 89 | 97 | 100 | COD 5342 BOD 1045 | 594 205 |

The date of Table I were obtained by analytical methods included in the textbook "Standard Methods for the Examination of Water and Wastewater", 12th edition, American Public Health Association, Inc., 1790 Broadway, New York, N.Y. 10019, 1965 as follows:

Chemical Oxygen Demand (COD) - page 510 Part IV

Biochemical Oxygen Demand (BOD) - page 415 Part III

Total Suspended Solids (TSS) page 424 Part III Method C

Coliform - page 610 Part VII

It will be readily observed from the examples in the table that the coliform bacteria are completely eliminated and the biological and chemical oxygen demand and total suspended solids significantly reduced in an extremely rapid treatment interval. The advantages of the apparatus and process of the present invention over prior techniques are thus evidenced by the rapid and efficient cleaning of wastewater to meet disposal regulatory standard requirements. The large reduction in total suspended solids is particularly surprising and must be added to increase the volume sufficiently to permit satisfactory treatment of the wastewater. Also, during continuous process operation if water is added to the treatment chamber to cause the layer of solid matter formed at the surface of the treatment chamber to overflow for disposal the wastewater is consequently diluted some extent. Such dilution of the mixture has been found to have no deleterious effect on the excellent results of disinfecting and removing solids from sewage water mixtures obtainable in the practice of this invention.

Although the invention has been described with reference to certain specific and preferred embodiments thereof, it is not to be so limited since changes and alterations may be made therein which are within the full and intended scope of this invention as defined by the appended claims.

We claim:

1. The process for treating sewage water which comprises:

A. providing a sewage-containing alkali metal halide solution to an upwardly tapered cell chamber ending in a solids discharge outlet and having submerged dimensionally stable electrodes disposed therein;

B. agitating and disintegrating solids contained in said solution;

C. passing a direct electrolyzing current between opposed dimensionally stable anodes and cathodes in said solution, whereby said solution and solids are disinfected and said solids float to the top of the chamber;

D. removing solids and entrained solution through the solids discharge outlet; and E. discharging treated solution from said chamber.

2. A process as in claim 1 wherein solids and treated solution are removed and discharged by the addition to the chamber of further solution to be treated.

* * * * *